United States Patent
Yang et al.

(10) Patent No.: US 11,620,147 B2
(45) Date of Patent: Apr. 4, 2023

(54) METADATA SERVICE PROVISIONING IN A CLOUD ENVIRONMENT

(71) Applicant: International Business Machines Corporation, Armonk, NY (US)

(72) Inventors: Na Fei Yang, Beijing (CN); Chen Ji, Beijing (CN); Huang Rui, Beijing (CN); Xiao Mei Zheng, Beijing (CN); Xian Dong Meng, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 1037 days.

(21) Appl. No.: 16/372,530

(22) Filed: Apr. 2, 2019

(65) Prior Publication Data

US 2020/0319905 A1    Oct. 8, 2020

(51) Int. Cl.
G06F 9/455    (2018.01)
G06F 21/60    (2013.01)
H04L 67/10    (2022.01)
H04L 67/51    (2022.01)

(52) U.S. Cl.
CPC ........ *G06F 9/45558* (2013.01); *G06F 21/606* (2013.01); *H04L 67/10* (2013.01); *H04L 67/51* (2022.05); *G06F 2009/45583* (2013.01); *G06F 2009/45587* (2013.01)

(58) Field of Classification Search
None
See application file for complete search history.

(56) References Cited

U.S. PATENT DOCUMENTS

| | | | |
|---|---|---|---|
| 8,909,939 B1* | 12/2014 | Beda, III | G06F 21/53 713/189 |
| 9,430,255 B1 | 8/2016 | Beda, III | |
| 9,798,566 B2* | 10/2017 | Beda, III | G06F 16/955 |
| 10,686,837 B2* | 6/2020 | Chen | G06F 21/53 |
| 2014/0082350 A1* | 3/2014 | Zarfoss, III | H04L 63/083 713/155 |
| 2016/0191474 A1* | 6/2016 | Hinh | H04L 63/1408 718/1 |
| 2017/0288863 A1* | 10/2017 | Dimitrakos | H04L 9/0866 |
| 2018/0041515 A1* | 2/2018 | Gupta | H04L 63/0815 |
| 2019/0007382 A1* | 1/2019 | Nirwal | G06F 9/54 |

OTHER PUBLICATIONS

"Instance Metadata and User Data", Amazon Elastic Compute Cloud, printed on Jan. 29, 2018, 16 pages, <https://docs.aws.amazon.com/AWSEC2/latest/UserGuide/ec2-instance-metadata>.
Mell et al., "The NIST Definition of Cloud Computing", NIST National Institute of Standards and Technology U.S. Department of Commerce, Special Publication 800-145, Sep. 2011, 7 pages.

* cited by examiner

*Primary Examiner* — Isaac Tuku Tecklu
(74) *Attorney, Agent, or Firm* — Stephanie L. Carusillo (57) ABSTRACT

In an approach a computer receives a first request from a metadata service to store metadata for a virtual machine (VM). The computer validates the metadata service. The computer stores the metadata for the VM in response to the validation being successful. The computer receives a second request from the VM for the metadata. The computer sends the metadata to the VM.

17 Claims, 7 Drawing Sheets

METADATA SERVICE PROVISIONING IN A CLOUD ENVIRONMENT

BACKGROUND

The present disclosure relates to the field of service provisioning, and more specifically, to methods, systems and computer program products for providing metadata for a virtual machine in a cloud environment.

Virtual machines (VM) are computer files (e.g., images) that to a user, behave similarly to an actual computer. Multiple virtual machines are capable of operating simultaneously on a single computer, without impacting the host computer or other virtual machines that are also housed on the same computer as each virtual machine includes virtual hardware (e.g., compute processing unit, memory, hard drives, network, etc.) specific to the individual virtual machine. For VMs housed on a server or the cloud, the VMs are managed by a hypervisor. Hypervisors drive virtualization by allowing multiple VMs to operate on the single computer, which maximizes the effective user of computing resources (e.g., memory, bandwidth, CPU cycles, etc.). Hypervisors separate the operating system and applications from underlying physical hardware. One type of hypervisor is directly deployed over hardware without underlying operating systems. A second type of hypervisor performs as a software layer within the physical operating system running in the separate second layer over the physical hardware while the operating system runs in a separate third layer.

Cloud computing utilizes a network of remote servers to store, manage, and process data, as opposed to utilizing a local server or a single computer (e.g., personal computer). Cloud computing may be implemented in a variety of manners (e.g., private, hybrid, and public). Private cloud environments run cloud servers within a data center exclusive to the enterprise (e.g., in-house cloud servers). Public cloud environments utilize a third-party provider that provides computing resources to the public over the Internet. Hybrid cloud computing environments include a combination of private (e.g., in-house, one premise) and third-party public cloud services that organize the provided services between the private and public cloud environments. In a cloud environment, at start-up of a VM, the VM needs customization data, which is also known as metadata. The metadata for a VM includes a hostname, Secure Shell (SSH) keys, passwords, and customized scripts, etc. that are associated with the VM in order to configure the VM and customize a cloud instance on the VM.

SUMMARY

Aspects of the present invention disclose a method, computer program product, and system for customizing a cloud based virtual machine, the method comprises one or more processors receiving a first request from a metadata service to store metadata for a virtual machine (VM). The method further comprises one or more processors validating the metadata service. The method further comprises one or more processors storing the metadata for the VM in response to the validation being successful. The method further comprises one or more processors receiving a second request from the VM for the metadata. The method further comprises one or more processors sending the metadata to the VM.

Example embodiments of the present disclosure disclose methods, systems, and computer program products for providing metadata for a virtual machine in a cloud environment.

In an aspect, a method is disclosed. According to the method, a first request from a metadata service to store metadata for a virtual machine (VM) is received. Then the metadata service is validated. And the metadata for the VM is then stored in response to the validation being successful. A second request from the VM for the metadata is received, and then the metadata is sent to the VM.

In another aspect, a computer-implemented system is disclosed. The system may include a computer processor coupled to a computer-readable memory unit, said memory unit comprising instructions that when executed by the computer processor implements the above method.

In yet another aspect, a computer program product is disclosed. The computer program product comprises a computer readable storage medium having program instructions embodied therewith. When executed on one or more processors, the instructions may cause the one or more processors to perform the above method.

It is to be understood that the summary is not intended to identify key or essential features of embodiments of the present disclosure, nor is it intended to be used to limit the scope of the present disclosure. Other features of the present disclosure will become easily comprehensible through the description below.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

Throughout the drawings, the same or similar reference numerals represent the same or similar elements.

DETAILED DESCRIPTION

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
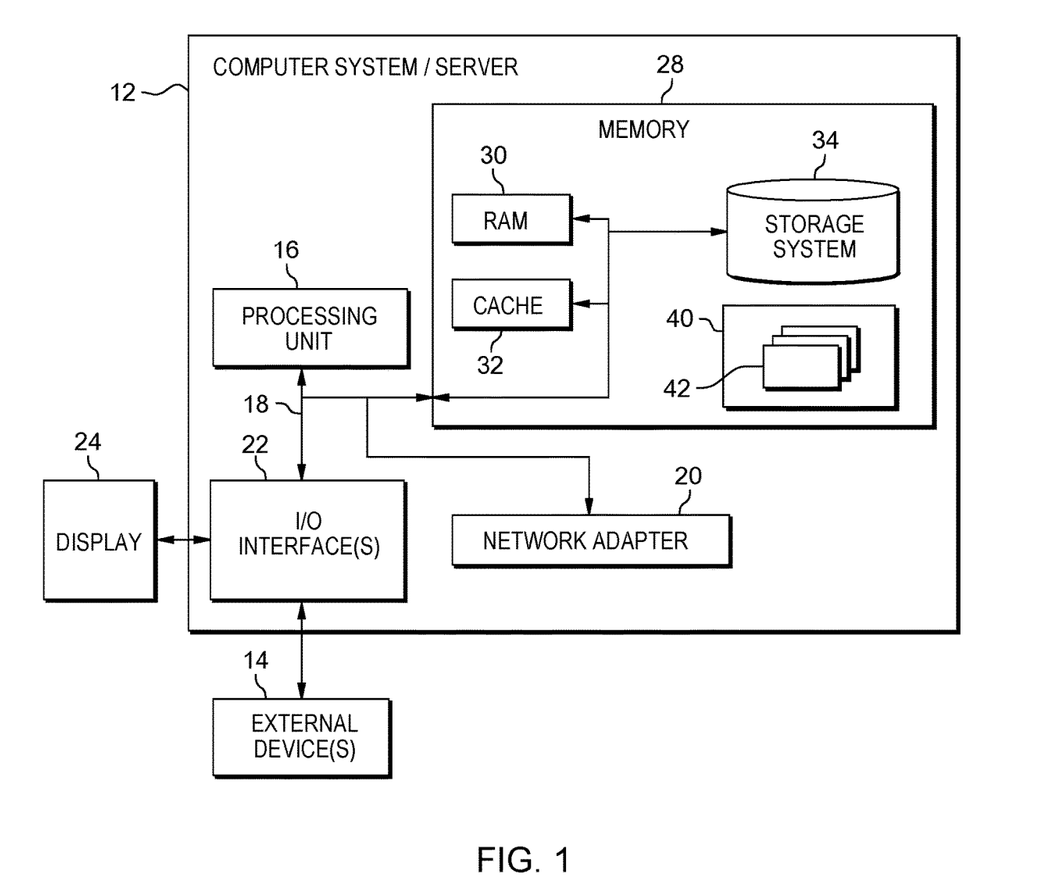
FIG. 1 depicts a cloud computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processing units 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
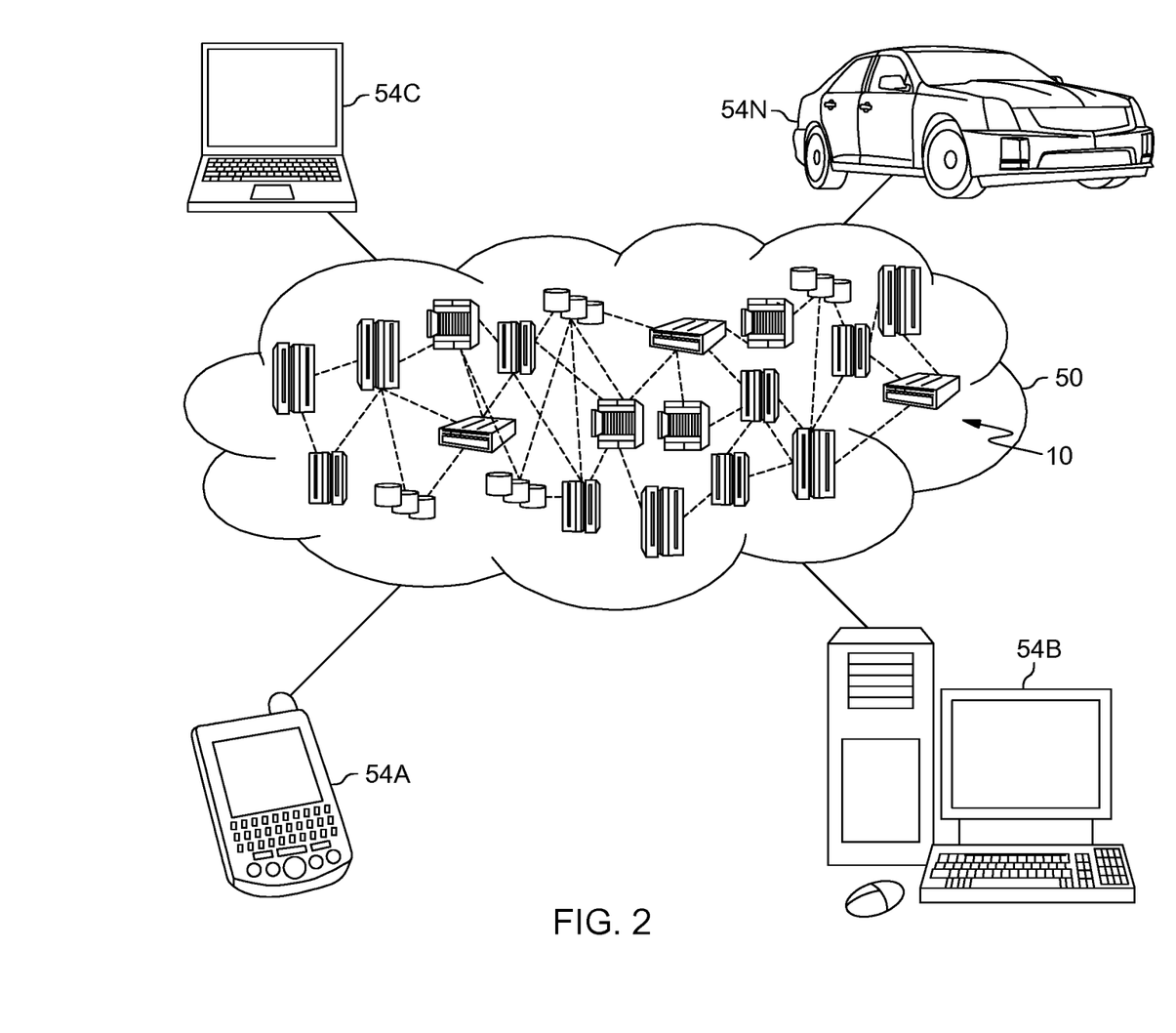
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
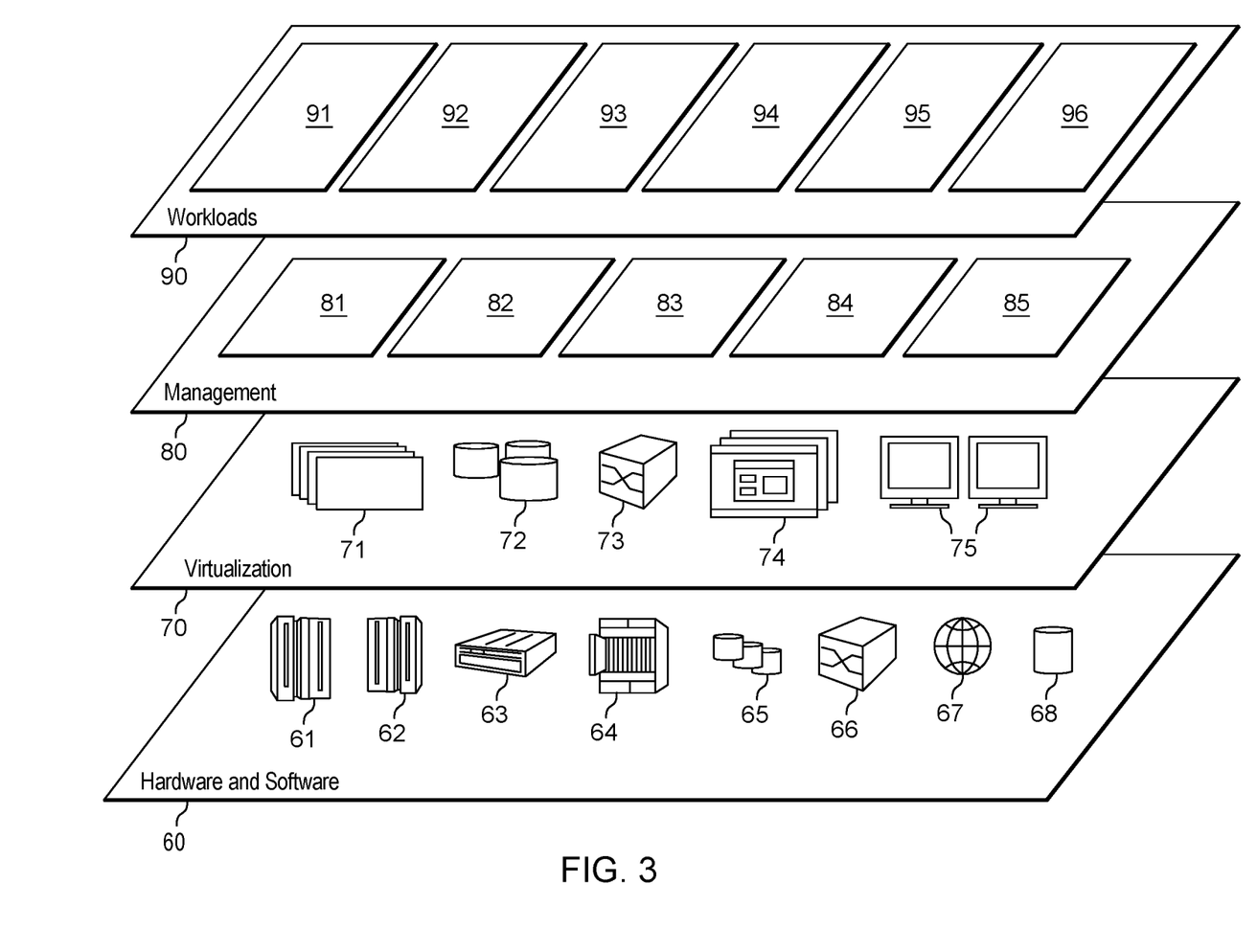
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and metadata service provisioning 96.

Virtual machine (VM) configuration and customization is an inevitable and important part for a cloud environment. These configuration and customization data are known as metadata, which may include VM's hostname, VM's SSH keys, VM's passwords, and customized scripts, etc. Nowadays, methods for providing metadata for a VM comprise a metadata service solution and a configure drive solution.

Figure 4:
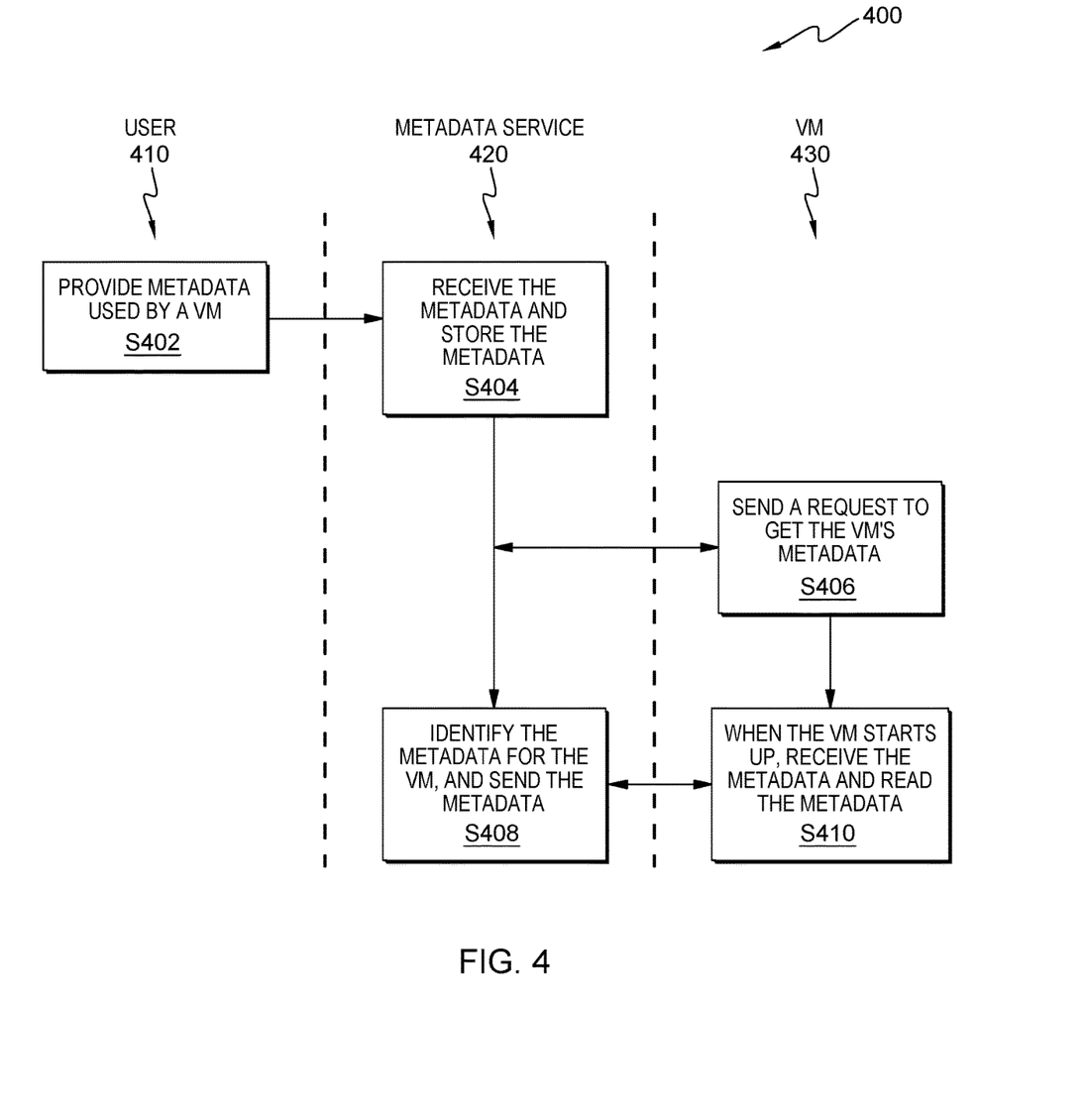
FIG. 4 depicts a flow diagram illustrating a method for providing metadata for a VM in a cloud environment using a metadata service solution.

FIG. 4 depicts a flow diagram illustrating a method 400 for providing metadata for VM 430 in a cloud environment using the metadata service solution. In the metadata service solution, metadata service 420 is hosted on a stand-alone server or on a cloud platform. Method 400 provides metadata for VMs directly. As shown in FIG. 4, at step S402, method 400 prompts user 410 to provide metadata used by a VM through metadata service 420 via a user interface. At step S404 of method 400, metadata service 420 receives the metadata entered by user 410 through the user interface and stores the metadata. In step S406 of method 400, metadata service 420 initiates start-up of VM 430. As part of start-up, VM 430 configures an associated TCP/IP network. Metadata service 420 receives a request via the configured TCP/IP network from VM 430 for the metadata. In response to the received request from VM 430, metadata service 420 identifies the metadata for VM 430 (e.g., stored metadata entered by user 410). At step S408 of method 400, metadata service 420 sends the metadata to VM 430 via the TCP/IP network. At step S410 of method 400, VM 430 receives and reads the metadata, thereby consuming the metadata in order to configure VM 430, run customized scripts, and the like. Once the metadata is updated, the solution can support live metadata updates of VM 430. However, in the solution provided by method 400, metadata service 420 and VM 430 communicate via the TCP/IP network, and therefore utilize a complex network configuration for VM 430. In addition, the solution (e.g., method 400) is prone to error, which may lead to a failure in customization of VM 430.

Figure 5:
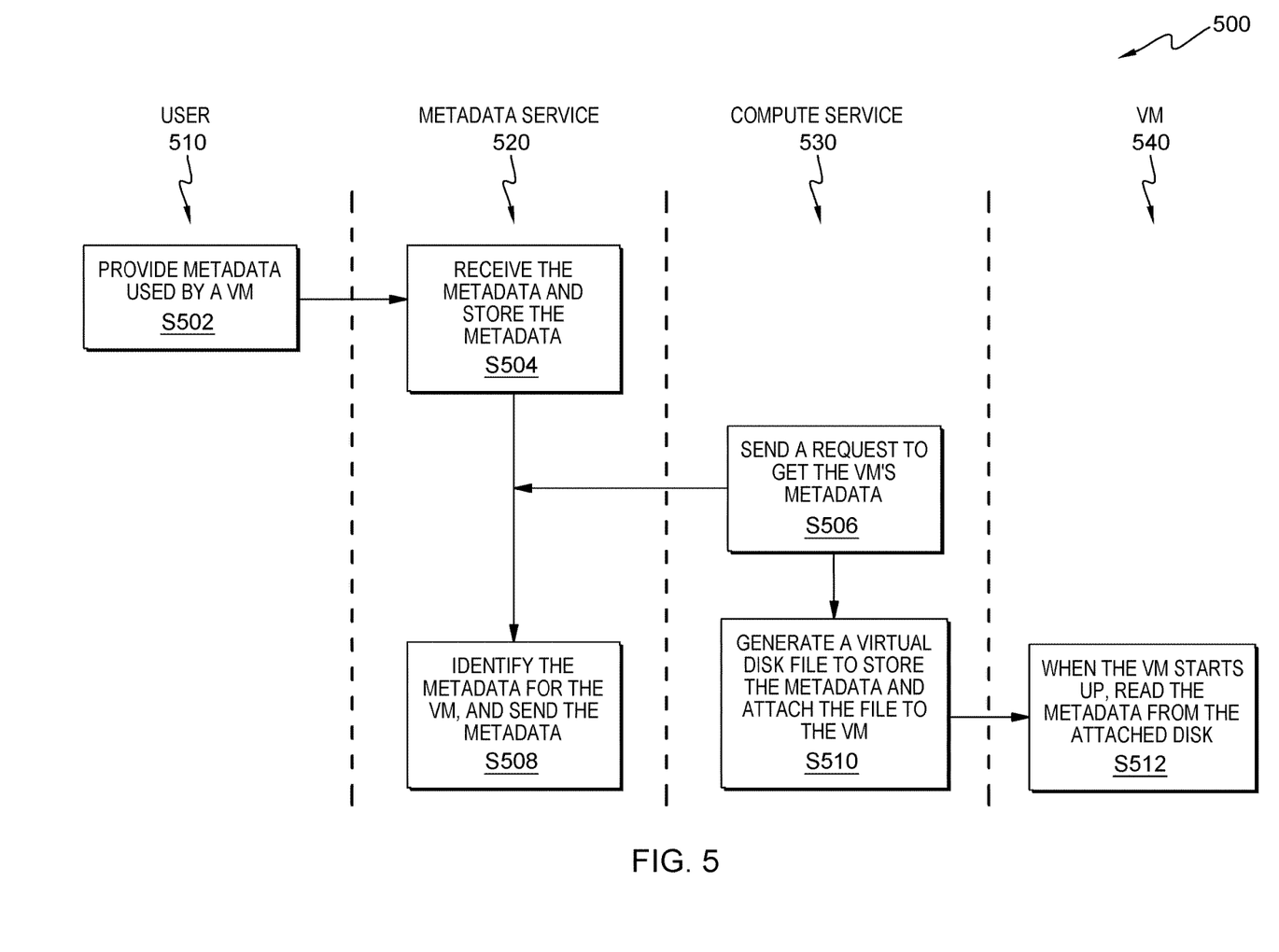
FIG. 5 depicts a flow diagram illustrating a method for providing metadata for a VM in a cloud environment using a configure drive solution.

FIG. 5 depicts a flow diagram illustrating a method 500 for providing metadata for VM 540 in a cloud environment using the configure drive solution. In a configured drive solution, a compute node locally generates the configure drive file that contains customization data for the VM. As shown in FIG. 5, steps S502, S504 are same as steps S402 and S404 in FIG. 4, which will not be described again for simplicity. The difference between the flows of FIG. 5 and FIG. 4 is that: in FIG. 4 VM 430 receives metadata from metadata service 420 directly, but in FIG. 5 VM 540 does not receive metadata from metadata service 520 directly. Instead in FIG. 5 at step S506 of method 500, compute service 530, which is located between metadata service 520 and VM 540, requests metadata service 520 provides the metadata of VM 540 via a TCP/IP network (both VM 540 and compute service 530 do not utilize a complex network configuration). At step S508 of method 500, metadata service 520 identifies the metadata for VM 540 and sends the metadata to compute service 530 via the TCP/IP network. At step S510 of method 500, compute service 530 generates a virtual disk file to store the received metadata and attaches the file to VM 540.

At step S512 of method 500, VM 540 starts up and reads the metadata from the attached disk to consume the metadata, in order to configure VM 540, run customized scripts, and the like. In the configure drive solution of method 500, if the metadata is updated on metadata service 520 after VM 540 starts up, VM 540 re-starts to consume the updated metadata from the virtual disk file. In other words, the solution cannot support a live metadata update, and the metadata will not be updated until the next time VM 540 is generated.

Therefore, embodiments of the present invention recognize that compute nodes utilize metadata services to retrieve metadata via specialized IPs. While the metadata service may update the instance metadata as a live update, a complex network configuration is required to accomplish the metadata update. Due to the complexity, embodiments of the present invention recognize that the process is prone to errors and results in customization failures. Embodiments of the present invention also recognize that if a complex network configuration is not utilized, the metadata service cannot perform live updates to the metadata without a re-start. Thus, embodiments of the present invention recognize that for a VM in a cloud environment, metadata for the VM needs to be provided, which does not require a complex network configuration for the VM and is also able to support live metadata updates, which does not include a re-start of the VM.

Embodiments of the present invention provide a secure and efficient solution to support a metadata service. Embodiments of the invention incorporate a two-tier authentication for verification of the metadata prior to storing and authentication of the metadata service. Furthermore, some embodiments of the present invention incorporate a pre-installed active engine to acquire authentication and retrieve metadata via the hypervisor based on shared memory over a supported intra-vm communication channel. By implementing two-tier authentication, embodiments of the present invention ensure that verified and trusted metadata is stored in the metadata service. Furthermore the pre-installed active engine ensures that a VM only retrieves metadata for the VM in a secure manner. Embodiments of the present invention simplify the retrieval of metadata, eliminating reliance on a complex network configuration to ensure trustworthiness of the metadata and tasks that are error prone.

Figure 6:
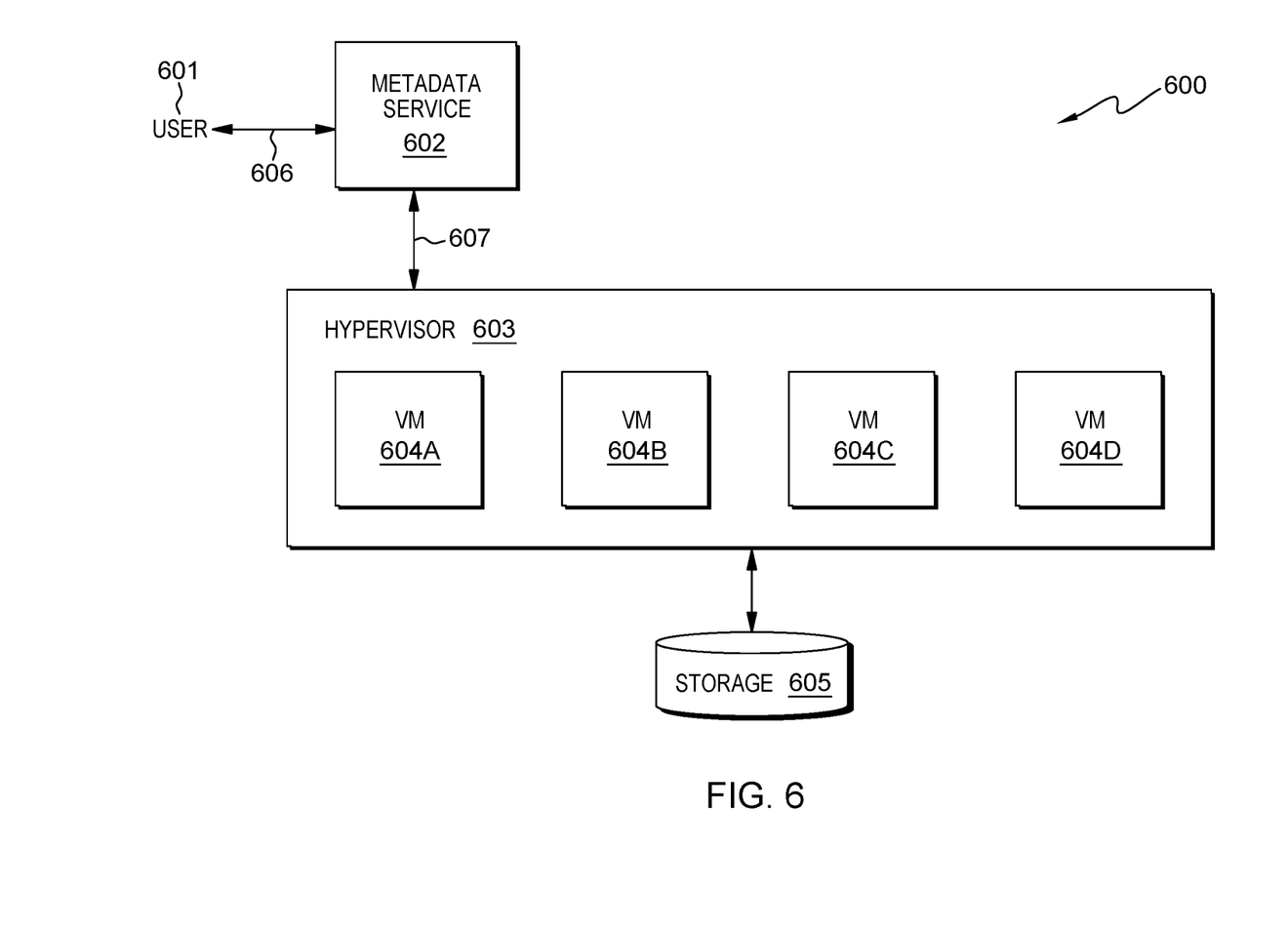
FIG. 6 depicts a block diagram illustrating a system structure for providing metadata for a VM in a cloud environment according to an embodiment of the present invention.

FIG. 6 depicts a block diagram illustrating system structure 600 for providing metadata for VMs 604 in a cloud environment according to an embodiment of the present invention. Referring to FIG. 6, system structure 600 comprises three components. The first component of system structure 600 is metadata service 602. Metadata service 602 protects the metadata by controlling resource access. Metadata service 602 receives metadata/updated metadata of VMs 604 from user 601 via user interface 606. In FIG. 6, multiple VMs are included that collectively represent VMs 604, which are depicted herein as VM 604A, VM 604B, VM 604 C, and VM 604D respectively. While FIG. 6 only depicts VM 604A, VM 604B, VM 604 C, and VM 604D, additional instances of VMs 604 (not shown) may also be included, or excluded based on the nature of the system structure. Metadata service 602 sends the metadata/updated metadata of VMs 604 to hypervisor 603 via TCP/IP network 607 so that the metadata/updated metadata can be stored to a storage, such as local storage 605 of hypervisor 603 or a remote storage (not shown). The second component of system structure 600 is hypervisor 603. Hypervisor 603 receives the metadata/updated metadata of VMs 604 from metadata service 602 and manages the metadata/updated metadata for VMs 604. For example, metadata service 602 receives requests from each depicted instance of VMs 604 and sends the metadata/updated metadata to respective VMs 604. The third component of system structure 600 comprises at least one instance of VMs 604, which detects respective updated metadata from hypervisor 603. Additionally, VMs 604 may request and receive the respective metadata/updated metadata from hypervisor 603.

In some embodiments, hypervisor 603 receives registration of metadata service 602 in advance (e.g., metadata service 602 is previously registered to hypervisor 603 as a metadata service). Hypervisor 603 receives the metadata/updated metadata of VMs 604 from metadata service 602. Hypervisor 603 first validates that metadata service 602 is a registered metadata service, (e.g., hypervisor 603 checks whether metadata service 602 was previously registered as a valid service). If hypervisor 603 determines that the validation is successful, then hypervisor 603 receives the metadata/updated metadata of VMs 604 sent from metadata service 602. Otherwise, if hypervisor 603 determines that the validation is not successful, then hypervisor 603 rejects the metadata/updated metadata of VMs 604 that is sent from metadata service 602.

In some embodiments, a token can be used in the validation. In this solution, hypervisor 603 maintains a registered metadata service using a record such as a table, an XML file, an Access Control List database, etc. At registration, hypervisor 603 creates a new record for metadata service 602 (e.g., registers metadata service 602 to a newly created record). Hypervisor 603 receives a request to store metadata/updated metadata of VMs 604 from metadata service 602. Hypervisor 603 determines whether metadata service 602 is in the record based on the received request. If hypervisor 603 determines that metadata service 602 is in the record, then hypervisor 603 sends a token to metadata service 602. In response to receipt of the token from hypervisor 603, metadata service 602 sends the metadata/updated metadata of VMs 604 together with the token to hypervisor 603 (e.g., hypervisor 603 receives the token and metadata/updated metadata of VMs 604) from metadata service 602. If hypervisor 603 determines that metadata service 602 is not in the record, then hypervisor 603 rejects the request. More specifically, only after hypervisor 603 verifies the token, may hypervisor 603 receive and store the received metadata/updated metadata.

In some embodiments, symmetric encryption can be used in the validation. Symmetric encryption technologies utilize a single key, password, or passphrase that encrypts and decrypts data, which is shared between the originator and recipient. In this solution, hypervisor 603 maintains a registered metadata service using a record such as a table, an XML file, an Access Control List database, and the like. Hypervisor 603 registers metadata service 602 to a new record that includes creation of a password. Hypervisor 603 receives a requests to store metadata/updated metadata of the VMs 604 from metadata service 602. The request is sent with an encrypted password, in which the encryption key can be exchanged in another communication channel, or generated on-line by hypervisor 603. Hypervisor 603 determines whether metadata service 602 is in the record and whether the decrypted password is correct (e.g., two-tier authentication). If hypervisor 603 does not verify that metadata service 602 is in the record and the decrypted password is correct, then hypervisor 603 may not receive and store the received metadata/updated metadata. It can be understood that there are other symmetric encryption implementations which can be used in this solution.

In some embodiments, asymmetric encryption can be used in the validation. Asymmetric encryption technologies utilize a pair of keys, in which a first key (e.g., secret key) encrypts data and the second key (e.g., public key) decrypts the data. In this solution, hypervisor 603 maintains a registered metadata service using a record such as a table, an XML file, an Access Control List database, and the like. Hypervisor 603 registers metadata service 602 to a new record and includes creation of a public key for metadata service 602. Hypervisor 603 receives a request from metadata service 602 to store metadata/updated metadata of VMs 604, in which the sent request is encrypted with a created private key (e.g., second key of the key pair created for metadata service 602). Hypervisor 603 determines whether metadata service 602 is in the record. If hypervisor 603 determines that metadata service 602 is in the record, then hypervisor 603 decrypts metadata/updated metadata of VMs 604 with the stored public key of metadata service 602. However, only if hypervisor 603 verifies that metadata service 602 is in the record and the sent encrypted metadata/updated metadata can be decrypted with the stored public key (e.g., two-tier authentication), may hypervisor 603 receive and store the received metadata/updated metadata. Otherwise, hypervisor 603 determines that the validation fails (e.g., metadata service 602 is not in the record and/or stored public key is unable to decrypt the metadata encrypted by the private key), and hypervisor 603 rejects the request. It can be understood that there are other asymmetric encryption implementations which can also be used in this solution.

It may be understood that other validation methods can be used in addition to or in conjunction with one of more of the aforementioned methods.

In some embodiments, the record of registered metadata services may be stored together with the metadata by hypervisor 603 in the same storage. In some other embodiments, the record of registered metadata services and the metadata may be stored by hypervisor 603 separately in different storages.

Although in an embodiment, metadata service 602 and hypervisor 603 communicate via an unsecured TCP/IP network, the validation process ensures secure communication. In the embodiments, the network configuration for the VM's will be simple in order to utilize the aforementioned validation processes.

Hypervisor 603 may manage a plurality of instances of VMs 604. Hypervisor 603 may communicate with the plurality of instances of VMs 604 via a TCP/IP network, which may require a complex network configuration for the VMs 604. Additionally, communication between hypervisor 603 and the plurality of instances of VMs 604 may be unsecure without incorporation of the above validation process. In some embodiments, the communication between hypervisor 603 and respective instances of VMs 604 via TCP/IP network may refer to the above validation process used between metadata service 602 and hypervisor 603 to ensure communication security. Currently, VMs 604 can support live metadata updates, if hypervisor 603 and VMs 604 communicate via TCP/IP network. However, the network configuration for the TCP/IP network is very complex.

In some embodiments, hypervisor 603 may communicate with VMs 604 via an inner security channel instead of a TCP/IP network channel. For example, shared memory can be used as the inner security channel for a S390X z/VM hypervisor (e.g., intra-vm data communication). IUCV (Inter User Communication Vehicle), which allows a point to point communication channel to be established either between two VMs or between a VM and hypervisor service, is an implementation of shared memory (e.g., intra-vm data communication). In another example, XenBus can be used as the inner security channel for a Xen Hypervisor). The inner security channel prevents illegal incursion and increases network security.

In some further embodiments, a validation process similar to the above validation process is utilized between metadata service 602 and hypervisor 603 for communication between hypervisor 603 and respective instances of VMs 604 via the above inner security channel to provide more secure communication.

In some embodiments, an active engine (not shown in FIG. 6) of VMs 604 may initialize VMs 604 at start up. The active engine is a service daemon that is pre-installed on VMs 604 to interact with metadata service 602. The active engine in VMs 604 can communicate with hypervisor 603 to request and receive the metadata (e.g., retrieves the metadata for a specific instance of VMs 604). The active engine is also enhanced in embodiments of the present invention to detect the updated metadata from hypervisor 603 via the inner security channel (e.g., intra-vm communication channel).

In one example, hypervisor 603 receives the metadata for VMs 604 from user 601, and a timestamp is also recorder that indicates the time when the metadata is received from user 601. If the active engine receives the metadata from hypervisor 603, the timestamp is also obtained and recorded. The active engine may regularly query hypervisor 603 for a first timestamp associated with the latest metadata stored in hypervisor 603 via the inner security channel. The active engine compares the first timestamp stored in hypervisor 603 with a second timestamp associated the stored metadata in VMs 604. If the active engine determines that the first and second timestamp are the same, then the active engine determines that the metadata stored in VMs 604 does not include an update. Otherwise, if the active engine determines that the first and second timestamp are not the same, then the active engine determines that the metadata stored in VMs 604 has been updated. Based on the presence of updated metadata, the active engine requests that hypervisor 603 sends the latest metadata (e.g., the updated metadata) stored in hypervisor 603 to consume. The first timestamp is also recorded in VMs 604 for the next comparison to determine whether another update is present.

In another example, hypervisor 603 receives the metadata for VMs 604 as input by user 601, and the received metadata from user 601 is kept under version control. Once the metadata is updated, a new version number for the updated metadata is generated in hypervisor 603. If the active engine receives the metadata for VMs 604, the version number of the metadata is also obtained. The active engine may regularly query the version number of the latest metadata stored in hypervisor 603 via the inner security channel. The active engine compares the version number of the latest metadata stored in hypervisor 603 with a version number of the metadata stored in VMs 604. If the active engine determines that the version number of the latest metadata stored in hypervisor 603 and the version number of the metadata stored in VMs 604 are the same, then the active engine determines that VMs 604 does not store updated metadata. Otherwise, if the active engine determines that the version number of the latest metadata stored in hypervisor 603 and the version number of the metadata stored in VMs 604 are not the same, then the active engine determines that the metadata stored in VMs 604 has been updated. The active engine requests hypervisor 603 to send the latest metadata (e.g., the updated metadata) stored in hypervisor 603 to consume. Furthermore, the version number of the newest metadata stored in hypervisor 603 is recorded in VMs 604 for the next comparison.

In yet another example, hypervisor 603 receives the metadata for VMs 604 from input provided by user 601 via the user interface. The received metadata from user 601 is computed to get a digest (i.e., a document, a message, a keyword, or another data item condensed in to a very short fixed length summary), such as a hash value, by using an encrypted algorithm, such as Message Digest 5 (MD5) (e.g., 128 bits), sha1 (e.g., 160 bits), and the like, which may be utilized to verify the integrity of received data in cryptography and to generate a unique identifier. Once the metadata is updated, a new digest for the updated metadata is generated in hypervisor 603. If the active engine receives the metadata for VMs 604, the digest of the metadata is also obtained. The active engine may regularly query the digest of the latest metadata stored in hypervisor 603 via the inner security channel. The active engine compares the digest of the latest metadata stored in the hypervisor 603 with a digest of the metadata stored in VMs 604. If the active engine determines that the digest of the latest metadata stored in the hypervisor 603 and the digest of the metadata stored in VMs 604 are the same, then the active engine determines that VMs 604 does not include updated metadata. Otherwise, if the active engine determines that the digest of the latest metadata stored in the hypervisor 603 and the digest of the metadata stored in VMs 604 are not the same, then the active engine determines that the metadata stored in VMs 604 has been updated. The active engine requests hypervisor 603 to send the latest metadata (e.g., the updated metadata) stored in hypervisor 603 to VMs 604. Additionally, the digest of the latest metadata stored in hypervisor 603 is also recorded in VMs 604 for next comparison.

In yet another example, user 601 is registered as a trusted user of metadata service 602. User 601 sends an update request for the metadata to metadata service 602. If the request is authenticated by metadata service 602, then metadata service 602 receives a token, which is returned to the compute node. At start-up utilizing the pre-installed active engine, metadata service 602 receives the token from the compute node from the active engine. Metadata service 602 utilizes the token to successfully authorize retrieval of the specific metadata from VMs 604. If the token is authorized, then metadata service 602 retrieves corresponding metadata from hypervisor 603 through a supported intra-vm communication channel that is based on shared memory, thereby ensuring only trusted metadata is received and does not rely on a complex network connection. Furthermore, metadata service 602 controls the aspects of session establishment, message passing, and flow control between metadata service 602 and VMs 604.

It can be understood that other detection methods can also be used, such as the active engine on VMs 604 (not shown), which may monitor communications between hypervisor 603 and metadata service 602 to detect the updated metadata, and the like.

Once the active engine on VMs 604 receives the updated metadata, the active engine can perform an on-line update of the metadata, in other words, VMs 604 does not need to re-start, and can read and consume the updated metadata directly (e.g., the solution supports live metadata updates).

Figure 7:
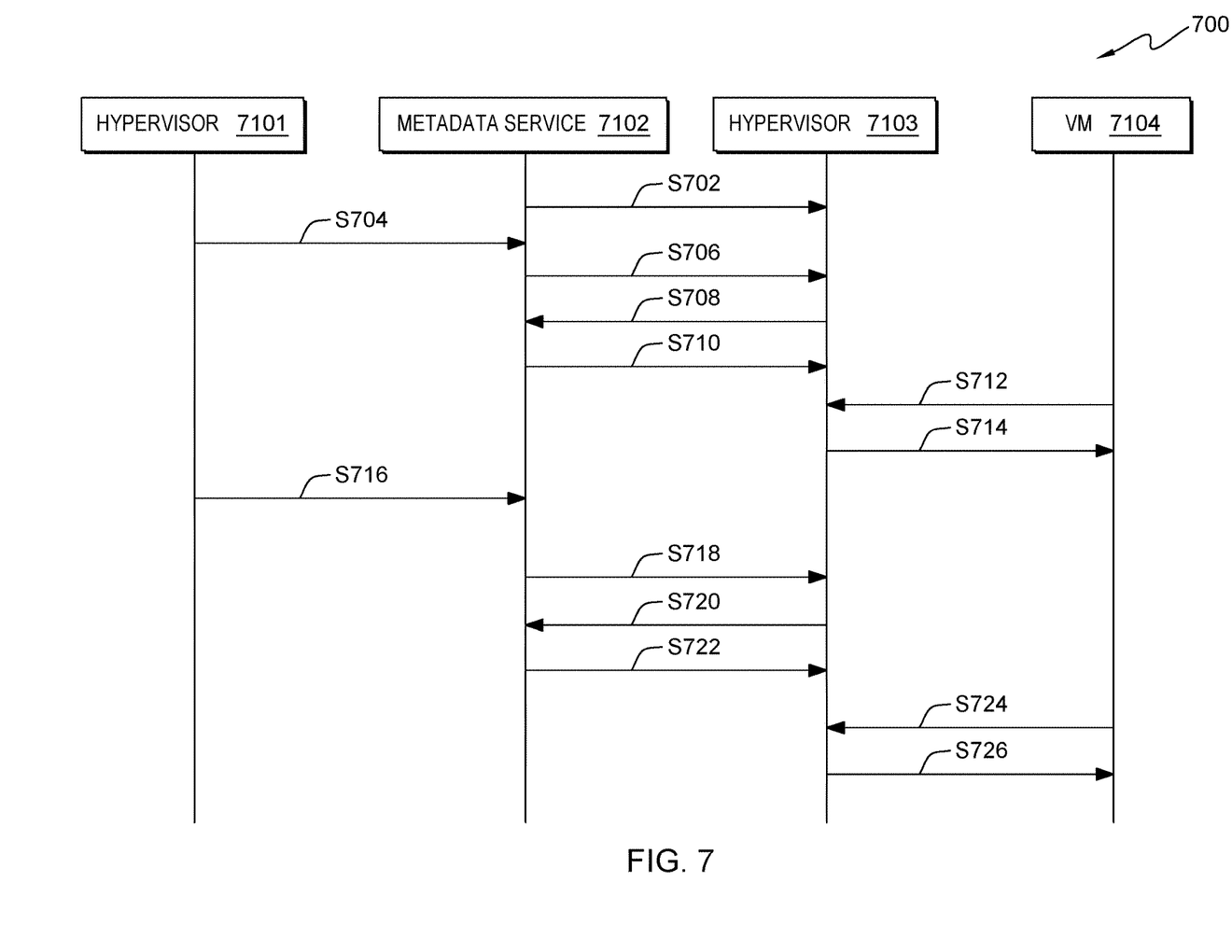
FIG. 7 depicts a flow diagram illustrating a method for providing metadata for a VM in a cloud environment according to an embodiment of the present invention.

FIG. 7 depicts a flow diagram illustrating method 700 for providing metadata for VM 7104 in a cloud environment according to an embodiment of the present invention. Referring to FIG. 7, method 700 begins at step S702, in which metadata service 7102, deployed on a server, registers to hypervisor 7103 as a valid service via a TCP/IP network. Hypervisor 7103 maintains a record for the valid metadata service. For example, the record includes the IP address of metadata service 7102, or the host name of the server of metadata service 7102, and the like. In one embodiment, method 700 performs validation of metadata service 7102 based on symmetric encryption technologies, in which the record also includes the password of metadata service 7102. In another embodiment, method 700 performs validation of metadata service 7102 based on asymmetric encryption technologies, in which the record also includes the public key of the metadata service.

Method 700 proceeds to step S704 to launch VM 7104. Method 700 prompts user 7101 to launch VM 7104 by inputting metadata of VM 7104 via a user interface between user 7101 and metadata service 7102. User 7101 is a trusted user of metadata service 7102 (e.g., user 7101 is registered and identified as a trusted user). Method 700 implements step S704 using existing technologies, such as a command line, or a user interface (UI) provided by metadata service 7102 for users, and the like. Metadata service 7102 receives the metadata for VM 7104.

At step S706, of method 700 metadata service 7102 requests hypervisor 7103 store the metadata for VM 7104 via the TCP/IP network.

In step S708, method 700 determines whether metadata service 7102 is a valid metadata service. Hypervisor 7103 validates whether metadata service 7102 is a valid metadata service based on a token solution, a symmetric encryption solution, an asymmetric encryption, or the like as mentioned above. If method 700 determines that the validation is successful, then hypervisor 7103 informs metadata service 7102 of the successful validation. Metadata service 7102 creates an instant access rule in the resource access control list (RACL) database dynamically. The access rule defines which metadata instances control the resource (e.g., VM 7104) of hypervisor 7103. At step S710 of method 700 metadata service 7102 sends the metadata to hypervisor 7103 to store the metadata in a storage.

In step S712 of method 700, in which the VM 7104 has started up, VM 7104 requests hypervisor 7103 for the metadata of VM 7104 via an inner security channel, such as IUCV for a S390X z/VM hypervisor or a XenBus for a Xen Hypervisor. In step S714 of method 700, hypervisor 7103 sends the metadata of VM 7104 to VM 7104. The active engine of VM 7104 configures VM 7104 with the sent metadata. In addition, the active engine of VM 7104 may also run customized scripts in the metadata.

In some embodiment, method 700 includes optional step S716. In step S716, method 700 receives input from user 7101 to update the metadata of VM 7104 to hypervisor 7103 through metadata service 7102. Metadata service 7102 receives the updated metadata input by user 7101 through the user interface. In step S718 of method 700, metadata service 7102 requests hypervisor 7103 update the stored metadata, similarly to step S706. In step S720 of method 700, hypervisor 7103 revalidates metadata service 7102, similarly to step S708. In response to a successful revalidation at step S722 of method 700, metadata service 7102 sends the updated metadata to hypervisor 7103.

In some embodiments, method 700 may proceed to an optional step S724. In step S724 of method 700, VM 7104 detects updated metadata. In response to detecting updated metadata, VM 7104 may request hypervisor 7103 to send the updated metadata. In optional step S726 of method 700, hypervisor 7103 may send the updated metadata to VM 7104 so that VM 7104 can update the metadata directly, without necessitating a restart.

In some embodiments, before step S712 of method 400, hypervisor 7103 may create VM 7104. Hypervisor 7103 may validate VM 7104 using one of the above validation methods between the steps S712 and S714, and between the steps S724 and S726.

Based on the above embodiments, those skilled in the art would be able to discern other implementations, which are not described in detail in this disclosure.

It should be noted that the processing for providing metadata for VM 7104 in a cloud environment according to embodiments of this disclosure could be implemented by computer system/server 12 of FIG. 1.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer implemented method for customizing a cloud based virtual machine, the method comprising:
   receiving, by one or more processors, a first request from a metadata service to store metadata for a virtual machine (VM);
   validating, by the one or more processors, the metadata service;
   storing, by the one or more processors, the metadata for the VM in response to a validation of the metadata service being successful;
   receiving, by the one or more processors, a first request from the VM for the metadata;
   sending, by the one or more processors, the metadata to the VM;
   receiving, by the one or more processors, a second request from the metadata service to store updated metadata for the VM;
   revalidating, by the one or more processors, the metadata service;
   storing, by the one or more processors, the updated metadata for the VM in response to the revalidation being successful;
   receiving, by the one or more processors, a second request from the VM for the updated metadata; and
   sending, by the one or more processors, the updated metadata to the VM.

2. The method of claim 1, wherein the first request from the VM is received through an inner security channel, and the sending the metadata to the VM comprises: sending, by the one or more processors, the metadata to the VM via the inner security channel.

3. The method of claim 2, wherein the inner security channel comprises a shared memory for a hypervisor.

4. The method of claim 1, wherein the second request from the VM is sent by the VM in response to the updated metadata being detected by the VM, and wherein the updated metadata is consumed by the VM to support a live metadata update in the VM.

5. The method of claim 4, wherein the updated metadata is detected by the VM based on a comparison between the stored metadata in the VM and the updated metadata, wherein the comparison is a selection from a group consisting of: a timestamp comparison, a version number comparison, and a digest comparison.

6. The method of claim 1, wherein validating the metadata service comprises:
- determining, by the one or more processors, whether the metadata service is registered as a valid service based on a selection from a group consisting of: a record, an XML file, and an access control list database within a hypervisor; and
- responsive to determining the metadata service is registered as the valid service, determining, by the one or more processors, whether the metadata service results in a validation of the metadata based on a selection from a group consisting of: a token, symmetric encryption, and an asymmetric encryption.

7. A computer system for customizing a cloud based virtual machine, the computer system comprising:
- one or more computer processors;
- one or more computer readable storage media;
- program instructions stored on the one or more computer readable storage media for execution by at least one of the one or more computer processors, the program instructions comprising:
  - the program instructions to receive a first request from a metadata service to store metadata for a virtual machine (VM);
  - the program instructions to validate the metadata service;
  - the program instructions to store the metadata for the VM in response to the validation of the metadata service being successful;
  - the program instructions to receive a first request from the VM for the metadata;
  - the program instructions to send the metadata to the VM;
  - the program instructions to receive a second request from the metadata service to store updated metadata for the VM;
  - the program instructions to revalidate the metadata service;
  - the program instructions to store the updated metadata for the VM in response to the revalidation being successful;
  - the program instructions to receive a second request from the VM for the updated metadata; and
  - the program instructions to send the updated metadata to the VM.

8. The computer system of claim 7, wherein the first request from the VM is received through an inner security channel, and the sending the metadata to the VM comprises: the program instructions to send the metadata to the VM via the inner security channel.

9. The computer system of claim 8, wherein the inner security channel comprises a shared memory for a hypervisor.

10. The computer system of claim 7, wherein the second request from the VM is sent by the VM in response to the updated metadata being detected by the VM, and wherein the updated metadata is consumed by the VM to support a live metadata update in the VM.

11. The computer system of claim 10, wherein the updated metadata is detected by the VM based on a comparison between the stored metadata in the VM and the updated metadata, wherein the comparison is a selection from a group consisting of: a timestamp comparison, a version number comparison, and a digest comparison.

12. The computer system of claim 7, wherein the validating the metadata service further comprises the program instructions, stored on the one or more computer readable storage media, to:
- determine whether the metadata service is registered as a valid service based on a selection from a group consisting of: a record, an XML file, and an access control list database within a hypervisor; and
- responsive to determining the metadata service is registered as the valid service, determine whether the metadata service results in a validation of the metadata based on a selection from a group consisting of: a token, symmetric encryption, and an asymmetric encryption.

13. A computer program product for customizing a cloud based virtual machine, the computer program product comprising:
- one or more computer readable storage media and program instructions stored on the one or more computer readable storage media, the program instructions comprising:
  - program instructions to receive a first request from a metadata service to store metadata for a virtual machine (VM);
  - program instructions to validate the metadata service;
  - program instructions to store the metadata for the VM in response to the validation of the metadata service being successful;
  - program instructions to receive a first request from the VM for the metadata;
  - program instructions to send the metadata to the VM;
  - program instructions to receive a second request from the metadata service to store updated metadata for the VM;
  - program instructions to revalidate the metadata service;
  - program instructions to store the updated metadata for the VM in response to the revalidation being successful;
  - program instructions to receive a second request from the VM for the updated metadata; and
  - program instructions to send the updated metadata to the VM.

14. The computer program product of claim 13, wherein the first request from the VM is received through an inner security channel, and the sending the metadata to the VM comprises: sending the metadata to the VM via the inner security channel.

15. The computer program product of claim 14, wherein the inner security channel comprises a shared memory for a hypervisor.

16. The computer program product of claim 13, wherein the second request from the VM is sent by the VM in response to the updated metadata being detected by the VM, and wherein the updated metadata is consumed by the VM to support a live metadata update in the VM.

17. The computer program product of claim 16, wherein the updated metadata is detected by the VM based on a comparison between the stored metadata in the VM and the updated metadata, wherein the comparison is a selection from a group consisting of: a timestamp comparison, a version number comparison, and a digest comparison.

* * * * *